United States Patent
Tu et al.

(10) Patent No.: US 9,300,107 B2
(45) Date of Patent: Mar. 29, 2016

(54) BRIGHT FEW-CYCLE FIBER SOURCE USING RESONANT DISPERSIVE WAVE EMISSION IN AN OPTICAL FIBER

(71) Applicant: Board of Trustees of the University of Illinois, Urbana, IL (US)

(72) Inventors: Haohua Tu, Savoy, IL (US); Stephen A. Boppart, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 107 days.

(21) Appl. No.: 14/445,245

(22) Filed: Jul. 29, 2014

(65) Prior Publication Data

US 2016/0028204 A1    Jan. 28, 2016

Related U.S. Application Data

(60) Provisional application No. 61/865,461, filed on Aug. 13, 2013.

(51) Int. Cl.

| | |
|---|---|
| *G02B 6/26* | (2006.01) |
| *H01S 3/067* | (2006.01) |
| *G02B 6/02* | (2006.01) |
| *H01S 3/00* | (2006.01) |
| *H01S 3/11* | (2006.01) |
| *H01S 3/16* | (2006.01) |

(52) U.S. Cl.
CPC ........ *H01S 3/06725* (2013.01); *G02B 6/02214* (2013.01); *H01S 3/0057* (2013.01); *H01S 3/1106* (2013.01); *H01S 3/1608* (2013.01)

(58) Field of Classification Search
CPC . H01S 3/06725; H01S 3/0057; H01S 3/1106; H01S 3/1608; H01S 3/094076; H01S 3/091; H01S 3/1024; G02B 6/02214

USPC ........................................ 382/27, 125; 372/21
See application file for complete search history.

(56) References Cited

U.S. PATENT DOCUMENTS

| | | | |
|---|---|---|---|
| 7,609,731 B2 | 10/2009 | Dantus et al. ................. 372/30 |
| 8,526,772 B2 * | 9/2013 | Tu .......................... G02F 1/353 |
| | | | 372/21 |

(Continued)

OTHER PUBLICATIONS

Druon et al., "Pulse-compression down to 20 fs using a photonic crystal fiber seeded by a diode-pumped Yb:SYS laser at 1070 nm," *Opt. Express*, vol. 12, No. 15, pp. 3383-3396 (Jul. 2004).

(Continued)

*Primary Examiner* — Ellen Kim
(74) *Attorney, Agent, or Firm* — Sunstein Kann Murphy & Timbers LLP

(57) ABSTRACT

Methods and apparatus for generating ultrashort optical pulses. Pulses of an infrared source are launched into an optical fiber characterized by a zero-dispersion wavelength (ZDW), where the wavelength of the infrared source exceeds the ZDW of the optical fiber by at least 100 nm. A resonant dispersion wave (RDW) is generated in the optical fiber that has a central wavelength blue-shifted by more than 500 nm relative to the pump wavelength, and, in some cases, by more than 700 nm. The optical fiber has a core of a diameter exceeding the central wavelength of the RDW by at least a factor of five. In a preferred embodiment, the infrared source includes a master-oscillator-power-amplifier, embodied entirely in optical fiber, and may include an Erbium:fiber oscillator, in particular.

12 Claims, 4 Drawing Sheets
(3 of 4 Drawing Sheet(s) Filed in Color)

(56) References Cited

U.S. PATENT DOCUMENTS

| | | | | |
|---|---|---|---|---|
| 9,217,824 | B2* | 12/2015 | Knight | G02B 6/02 |
| 2010/0054661 | A1* | 3/2010 | Ramachandran | G02F 1/3513 385/28 |
| 2011/0013652 | A1* | 1/2011 | Knight | G02B 6/02347 372/6 |

OTHER PUBLICATIONS

Heidt, "Pulse preserving flat-top supercontinuum generation in all-normal dispersion photonic crystal fibers," *J. Opt. Soc. Am. B*, vol. 27, No. 3, pp. 550-559 (Mar. 2010).

Krauss et al., "Synthesis of a single cycle of light with compact erbium-doped fibre technology," *Nat. Photonics*, vol. 4, pp. 33-36 (Jan. 2010).

Kristensen et al., "Low-loss polarization-maintaining fusion splicing of single-mode fibers and hollow-core photonic crystal fibers, relevant for monolithic fiber laser pulse compression," *Opt. Express*, vol. 16, No. 13, pp. 9986-9995 (Jun. 2008).

McConnell et al., "Ultra-short pulse compression using photonic crystal fibre," *Appl. Phys. B*, vol. 78, pp. 557-563 (2004).

Nicholson et al., "A high coherence supercontinuum source at 1550 nm," *Opt. Fiber Comm. Conf. 2003*, 2 pages (2004).

Nishizawa et al., "Octave spanning high-quality supercontinuum generation in all-fiber system," *J. Opt. Soc. Am. B*, vol. 24, pp. 1786-1792 (Aug. 2007).

Pavlov et al., "High-power high-repetition-rate single-mode Er-Yb-doped fiber laser system," *Opt. Express*, vol. 20, No. 9, pp. 9471-9475 (Apr. 2012).

Schenkel et al., "Pulse compression with supercontinuum generation in microstructure fibers," *J. Opt. Soc. Am. B*, vol. 22, No. 3, pp. 687-693 (Mar. 2005).

Sudmeyer et al., "Nonlinear femtosecond pulse compression at high average power levels by use of a large-mode-area holey fiber," *Opt. Lett.*, vol. 28, No. 20, pp. 1951-1953 (Oct. 2003).

Tomlinson et al., "Compression of optical pulses chirped by self-phase modulation in fibers," *J. Opt. Soc. Am. B*, vol. 1, No. 2, pp. 139—(Apr. 1984).

Tu et al., "Emergence of self-organized long-period fiber gratings in supercontinuum-generating optical fibers," *Opt. Lett.*, vol. 34, No. 5, pp. 668-670 (Mar. 2009).

Tu et al., "Scalar generalized nonlinear Schrödinger equation-quantified continuum generation in an all-normal dispersion photonic crystal fiber for broadband coherent optical sources," *Opt. Express*, vol. 18, No. 26, pp. 27872-27884 (Dec. 2010).

Tu et al., "Compression of fiber-supercontinuum pulses to the Fourier-limit in a high numerical-aperture focus," *Opt. Lett.*, vol. 36, No. 12, pp. 2315-2317 (May 2011).

Tu et al., "Cross-validation of theoretically quantified fiber continuum generation and absolute pulse measurement by MIIPS for a broadband coherently controlled optical source," *Appl. Phys. B*, 9 pages (2011).

Udem et al., "Optical frequency metrology," *Nature*, vol. 416, pp. 233-237 (Mar. 2002).

von Vacano et al., "Shaper-assisted collinear SPIDER: fast and simple broadband pulse compression in nonlinear microscopy," *J. Opt. Soc. Am. B*, vol. 24, No. 5, pp. 1091-1100 (May 2007).

Wai et al., "Nonlinear pulse propagation in the neighborhood of the zero-dispersion wavelength of monomode optical fibers," *Opt. Lett.*, vol. 11, No. 7, pp. 464-466 (Jul. 1986).

Zhao et al., "Characteristics of supercontinuum generation in birefringent optical fibers," *Proc. Symp. IEEE/LEOS Benelux Chapter*, pp. 217-220 (2003).

\* cited by examiner

BRIGHT FEW-CYCLE FIBER SOURCE USING RESONANT DISPERSIVE WAVE EMISSION IN AN OPTICAL FIBER

The present application claims priority from U.S. Provisional Application Ser. No. 61/865,461, filed Aug. 13, 2013, which is incorporated herein by reference.

This invention was made with government support under Grants R01 CA166309 and R01 EB013723, awarded by the National Science Foundation, and Grant CBET1033906 awarded by the National Science Foundation. The Government has certain rights in the invention.

TECHNICAL FIELD

The present invention relates to methods and apparatus for optical pulse generation, and, more particularly, to generation of pulses tunable by blue-shifting to a specified band using mostly, or entirely, fiber components.

BACKGROUND ART

A source of compact ultrafast pulses, generating pulses that are transform-limited with a duration approaching a single optical cycle, is in high demand for such applications as ultrafast spectroscopy, fluorescence spectroscopy, photochemistry and photophysics, coherent controlled micro-spectroscopy, multiphoton microscopy, fluorescence lifetime imaging, and non-linear biomedical imaging. White-light generation by pumping an optical fiber pumped with an oscillator-type ultrafast laser is a promising technology for this source.

The coupling of a pulsed pump laser into a (longitudinally) uniform optical fiber has allowed nonlinear conversion of pump wavelengths into wavelengths that are difficult to access, while the pursuit of various favorable conditions has contributed to a basic theoretical understanding of soliton and dispersive wave dynamics. Notably, the 1999 discovery of Ti:sapphire oscillator-induced octave-spanning continuum, described in Ranka et al., *Visible continuum generation in air-silica microstructure optical fibers with anomalous dispersion at 800 nm*, Opt. Lett., vol. 25, pp. 25-27 (2000), stimulated the theoretical tools of reduced Maxwell's equations which attributed this phenomenon to the fission of higher-order solitons into red-shifted fundamental solitons and their blue-shifted phase-matched dispersive waves. The resulting unusual prediction that long pump pulses would be advantageous over short (fs) ones for uniform spectral broadening has led, for example, to the combination of a picosecond Yb:fiber master-oscillator-power-amplifier (MOPA) with a dispersion-engineered photonic crystal fiber (PCF), described by Travers, in *Blue extension of optical fibre supercontinuum generation*, J. Opt., vol. 12, 113001 (2010). In the Yb:fiber MOPA platform, however, the simple soliton-dispersive-wave picture must incorporate a pulse trapping mechanism to synchronize the blue and red expansions of the continuum, of the sort described by Gorbach et al., *Light trapping in gravity-like potentials and expansion of supercontinuum spectra in photonic crystal fiber*, Nat. Photon., vol. 1, pp. 653-, (2007), incorporated herein by reference. This condition achieves broad spectrum and high spectral brightness, but at the cost of temporal coherence due to high soliton order (N) modulation instability.

A complementary translation of the Yb:fiber MOPA results to a femtosecond Er:fiber platform using specifically Ge-doped fibers has lowered the soliton order, and thereby improved the coherence of the output, as described by Krauss et al., *Synthesis of a single cycle of light with compact erbium-doped fibre technology*, Nature Photon., vol. 4, pp. 33-36 (2009), incorporated herein by reference. Despite its narrower bandwidth and lower spectral brightness, the supercontinuum based on an Er:fiber platform allows few-cycle pulse compression and single-cycle pulse synthesis. Taking advantage of all-fiber pumps, the picosecond Yb:fiber platform and the femtosecond Er:fiber platform have arguably become the most popular techniques for fiber supercontinuum generation.

The use of a Ti:sapphire amplifier, at 800 nm, to produce energetic deep-UV pulses (down to 200 nm) has been demonstrated by Joly et al., *Bright spatially coherent wavelength-tunable deep-UV laser source using an Ar-filled photonic crystal fiber*, Phys. Rev. Lett., vol. 106, 203901 (2011) (hereinafter, "Joly (2011)"), incorporated herein by reference. This effect has been explained not only by the reduced Maxwell's equations but also, equally well, by the generalized nonlinear Schrödinger equation (GNLSE) under the slowly varying envelope approximation, indicating that complex theoretical models may not be necessary in sub-cycle regime modeling, as shown by Joly (2011).

Technology for upconversion of infrared pulses was described by the current inventors in U.S. Pat. No. 8,305,682 (issued Nov. 6, 2012, hereinafter "Tu '682), which is incorporated herein by reference. Methods described therein produced ultrashort pulses shifted from the infrared into the visible portion of the spectrum by nonlinear mechanisms such as four-wave mixing or by Cherenkov radiation (CR), otherwise referred to herein as resonant dispersion wave (RDW) generation.

RDW generation was predicted in 1986, by Wai et al., *Nonlinear pulse propagation in the neighborhood of the zero-dispersion wavelength of monomode optical fibers*, Opt. Lett., vol. 11, pp. 464-66 (1986), and has often been referred to as "Cherenkov radiation" in the literature. Visible RDW has only been observed in highly nonlinear fibers, and has been limited to an average power of a few mW, beyond which a dramatic spectral transformation toward continuum generation occurs at rather short (10 cm) fiber lengths, as shown by Hu et al., *Frequency-tunable anti-Stokes line emission by eigenmodes of a birefringent microstructure fiber*, Opt. Express, vol. 12, pp. 1932-37 (2004).

Prior methods, however, have produced average pulse power on the order of only milliwatts at most. An increase of average pulse power available in generated ultrashort pulses by an order of magnitude or more is desirable for purposes of non-linear imaging, in the biomedical context or otherwise.

It would thus be desirable for some new principle to allow for a resonant dispersion wave to attain hitherto precluded levels of average power. Such a principle has been uncovered by the present inventors and is now described.

SUMMARY OF EMBODIMENTS OF THE INVENTION

In accordance with embodiments of the invention, apparatus and methods are provided for generating clean, transform-limited pulses of at a targeted wavelength. Methods in accordance with preferred embodiments of the present invention have steps of:

a. coupling pump pulses of an infrared source characterized by a pump wavelength into an optical fiber characterized by a core diameter and a zero-dispersion wavelength, the pump wavelength exceeding the zero-dispersion wavelength of the optical fiber by at least 100 nm; and b. generating resonant dispersion wave (RDW) emission in the optical fiber, the RDW emission spectrally isolated from the pump pulses and characterized by a central wavelength blue-shifted by more than 500 nm relative to the pump wavelength;

wherein the core diameter of the optical fiber exceeds the central wavelength of the RDW by at least a factor of five.

In other embodiments of the present invention, the RDW emission may be characterized by a central wavelength blue-shifted by more than 700 nm relative to the pump wavelength. The RDW emission may, additionally, be temporally compressed. The pump pulse energy may exceed 40 nJ, and the RDW emission may exceed 1 nJ per pulse.

In accordance with further embodiments of the invention, the infrared source may include a master-oscillator-power-amplifier, and may be based upon an Erbium-doped fiber mode-locked oscillator.

In accordance with another aspect of the present invention, an apparatus is provided for generating ultrashort optical pulses characterized by a central wavelength. The apparatus has a source of infrared pulses. The wavelength of the infrared pulses exceeds the zero dispersion wavelength (ZDW) of the optical fiber by at least 100 nm, and the core diameter of the optical fiber exceeds the central wavelength of the ultrashort optical pulses by at least a factor of five.

In accordance with alternate embodiments of the present invention, the source of infrared pulses may include a master-oscillator-power-amplifier, and the infrared source may be based upon an Erbium-doped fiber mode-locked oscillator. The optical fiber may be polarization-maintaining. Additionally, optical energy may be optically guided through all components, which is to say, for example, that the entire apparatus may be implemented in optical fiber.

BRIEF DESCRIPTION OF THE DRAWINGS

The present patent or application file contains at least one drawing executed in color. Copies of this patent with color drawing(s) will be provided by the Patent and Trademark Office upon request and payment of any necessary fee.

The foregoing features of the invention will be more readily understood by reference to the following detailed description, taken with reference to the accompanying drawings, in which:

FIGS. 2A and 2B show calculated spectral and temporal evolution of a transform-limited Gaussian pulse of 9-nJ input energy propagating along a 9-cm length of NL-3.3-890-02 fiber (see text), while

DETAILED DESCRIPTION OF EMBODIMENTS OF THE INVENTION

Figure 1:
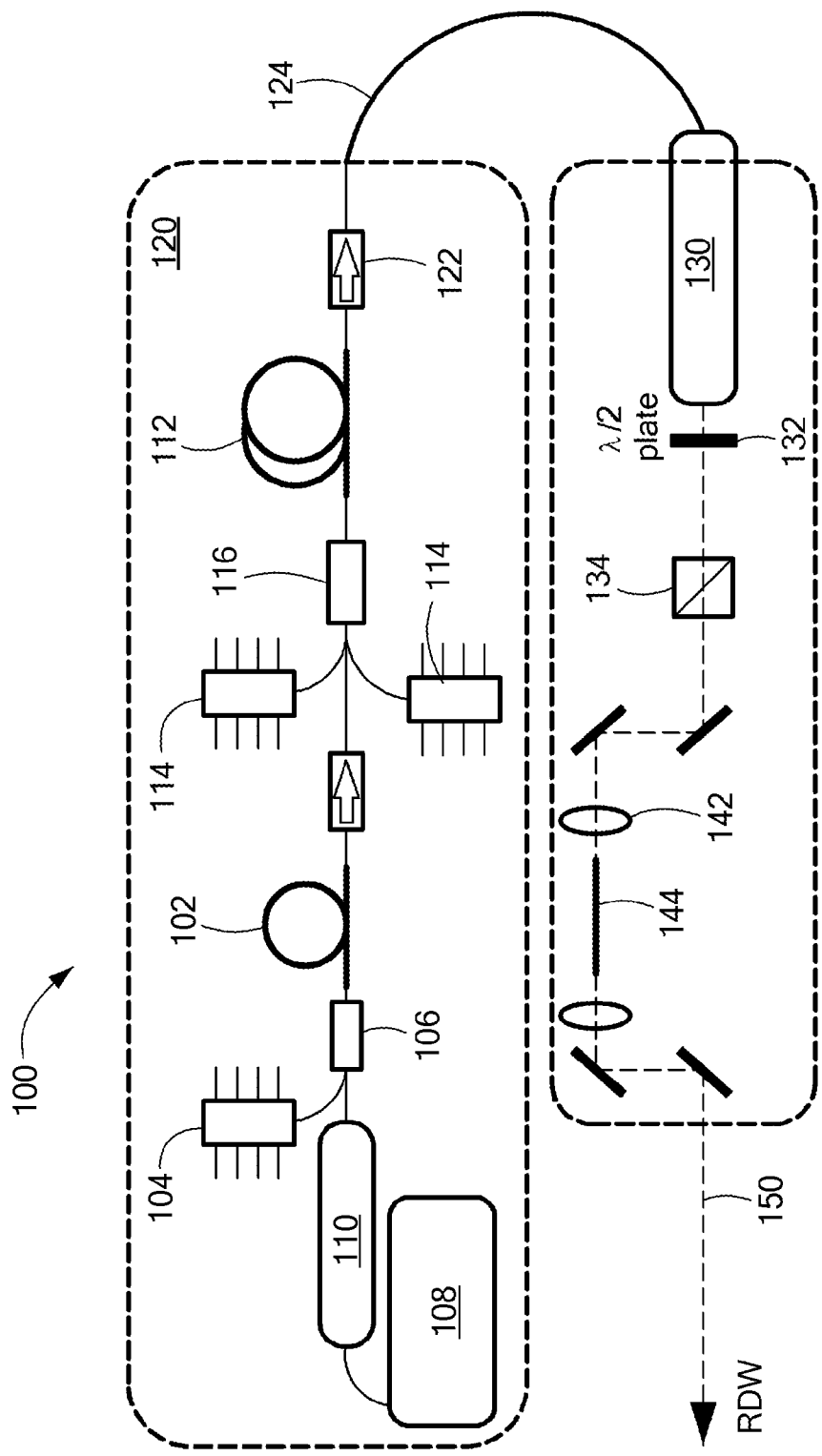
FIG. 1 is a schematic depiction of a system for generating ultrashort pulses in at a targeted wavelength in accordance with the present invention.

Definitions: As used herein, resonant dispersion wave (RDW) emission refers to emission from an optically pumped fiber that is characterized by two defining criteria: an isolated Gaussian-like spectrum displaced in wavelength from that of the pump, and a central wavelength governed by a nonlinear-phase-corrected phase matching condition described by Husakou et al., *Supercontinuum generation of higher-order solitons by fission in photonic crystal fibers*, Phys. Rev. Lett., vol. 87, 203901 (2001), which is incorporated herein by reference.

The term "resonant" as applied to a wave, or portion thereof, evolving in the course of propagation in an optical waveguide refers to a wave that evolves subject to a wave-vector-conserving phase-matching condition.

The "core diameter" of an optical fiber (PCF or otherwise) is defined as the diameter of a central solid core of the optical fiber through which optical waves are guided.

Where the present invention is described in terms of a PCF, it is to be understood that other optical fibers, where appropriate, which need not be PCFs, may be employed within the scope of the present invention.

The term "spectrally isolated RDW" is defined as characterized by a spectral gap of more than 300 nm between the central wavelength of the RDW and that of the pump. Spectral power in the spectral gap is more than 10 dB less than that of the RDW.

Embodiments of the invention described herein allow spectral coverage of the femtosecond Erbium fiber laser (hereinafter, "Er:fiber") platform to be extended into the UV-visible-near-IR region, corresponding to the popular optical frequency references and electronic transitions of absorptive or fluorescent molecules. The blue-extended femtosecond Er:fiber platform, made possible by virtue of the invention described herein, may advantageously bring numerous techniques of ultrafast electronic spectroscopy, frequency metrology, femtobiology, and nonlinear biomedical imaging into real-world applications.

The ~1550-nm wavelength emission of an Er:fiber laser has never, prior to the present invention, been converted to the UV-visible region in the fundamental mode of a uniform silica-based fiber, possibly due to the large (optical) frequency up-conversion ratio, equivalent to third (or fourth) harmonic generation.

The present inventors, however, employed GNLSE models to explore, using lower energy pump pulses and common solid-core fibers, whether biased spectral transformation toward the high frequency end could be realized in the compact fs Er:fiber platform. As demonstrated herein, such is, indeed, the case.

Theory

In accordance with the present invention, a GNLSE formalism is applied, as described in detail in Lægsgaard, *Modeling of nonlinear propagation in fiber tapers*, J. Opt. Soc. Am. B, vol. 29, pp. 3183-91 (2012), which is incorporated herein by reference. The GNLSE formalism of Lægsgaard (2012) was applied to a large mode-area PCF that can be characterized, for purposes of the formalism, by two cross-sectional parameters, namely a hole diameter and a hole-to-hole distance. An example of such a PCF is the LMA-8 fiber, available from NKT Photonics A/S of Birkerød, Denmark. The GNLSE formalism of Lægsgaard (2012) was also applied to a smaller-core PCF with an air-filling fraction exceeding 88%, of which an example is the NL-3.3-890-02 fiber, available from Thorlabs Inc. of Newton, N.J.

For purposes of the GNLSE calculation, pump pulses were assumed to be 1550-nm unchirped 80-fs (FWHM) 50-MHz Gaussian pulses, which approximate those of the fs Er:fiber platform. FIGS. 2A-2D represent calculated spectral and temporal evolution of pulses propagating through 9-cm lengths of the two fibers described above.

Figure 2A:
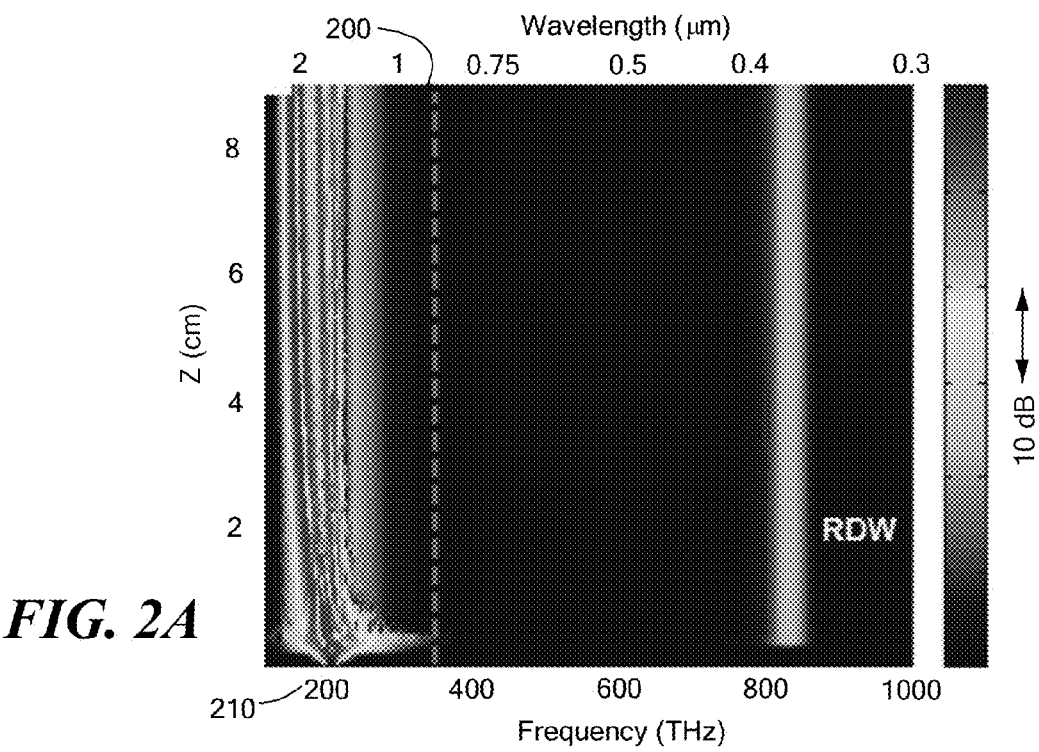
Figure 2B:
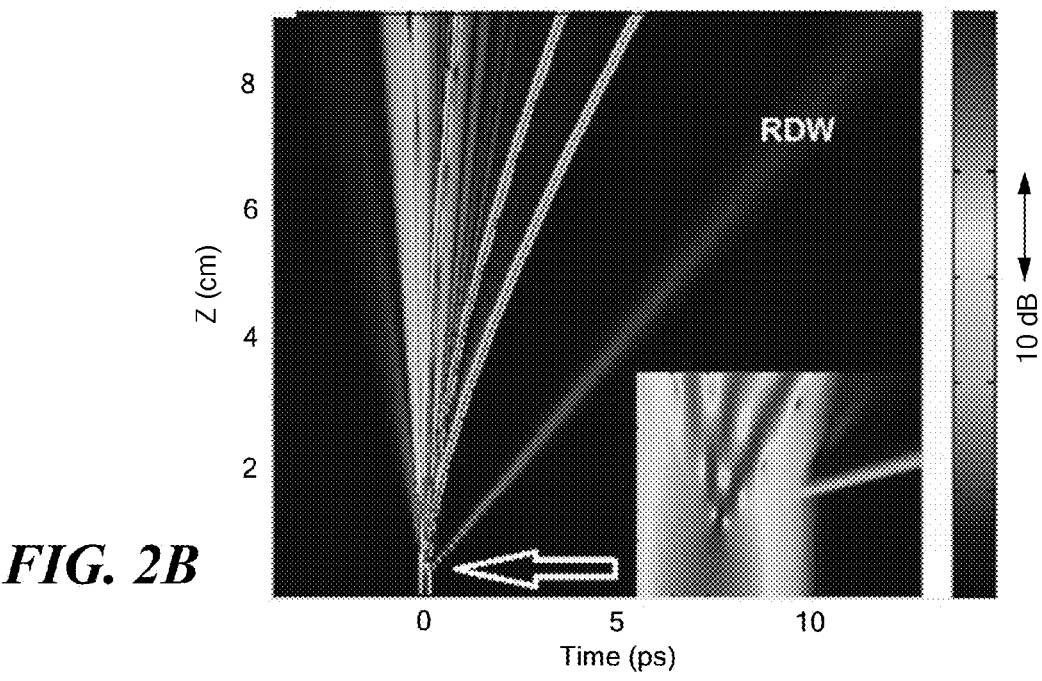

In the simulation depicted in FIGS. 2A and 2B, the LMA-8 fiber is pumped by an input pulse energy of 23.4-nJ, corresponding to a soliton order of N=4.9. In the simulation depicted in FIGS. 2C and 2D, the NL-3.3-890-02 fiber is pumped by an input pulse energy of 9-nJ, corresponding to a soliton order of N=6.1.

Figure 2C:
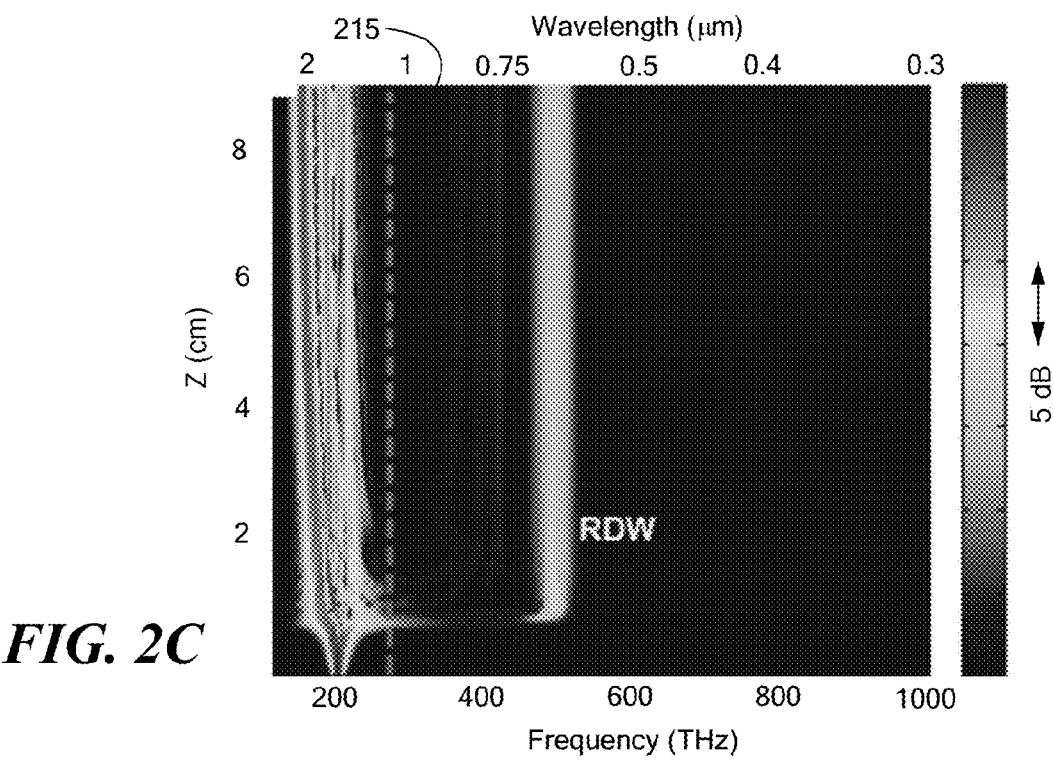
FIGS. 2C and 2D show corresponding calculated spectral and temporal evolution of a transform-limited Gaussian pulse of 23.4 nJ input energy propagating along a 9-cm length of LMA-8 fiber (see text). Color indicates relative intensity.
Figure 2D:
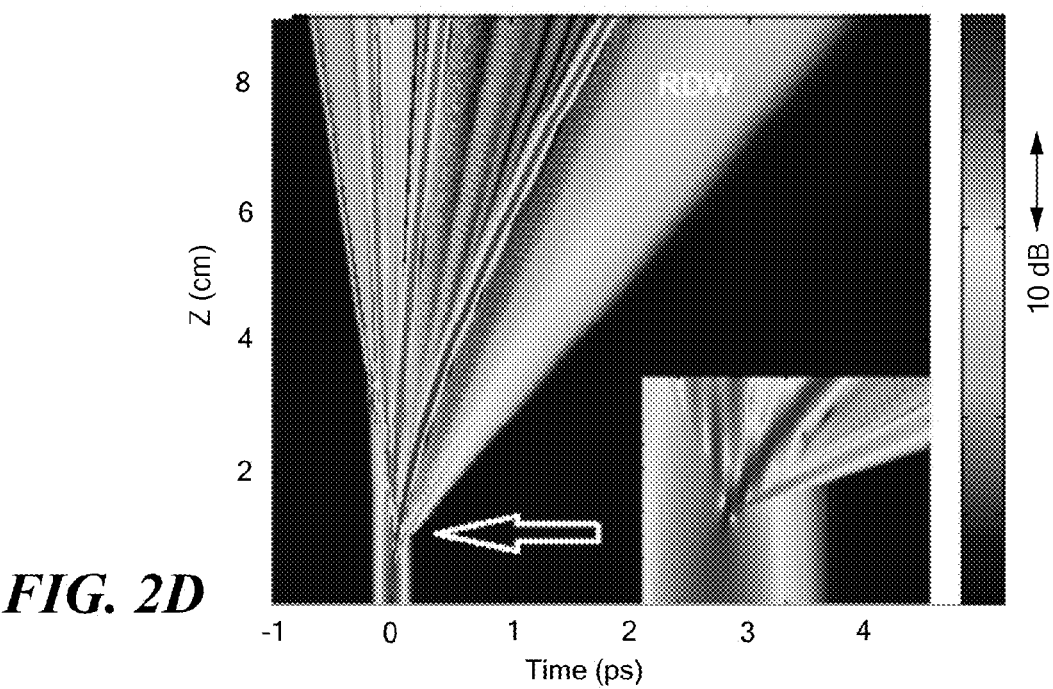

In FIGS. 2A-2D, the vertical axis, in each case, represents propagation into the fiber. Dashed line 200 represents the zero dispersion wavelengths (ZDWs) of the respective fibers, separating normal dispersion (on the right, short-wavelength, side) from anomalous dispersion (on the left, long-wavelength, side). Pump wavelength 210, evident at z=0, exceeds the zero-dispersion wavelength (ZDW) of the PCF by at least 100 nm. Insets in the temporal domain plots of FIGS. 2B and 2D are magnified images showing RDW generation at maximum input pulse compression.

Calculated spectral broadening shown in FIGS. 2A and 2C (for NL-3.3-890-02 and LMA-8 fiber, respectively) exhibit similar dispersion wave generation with no influence (blueshift) from pulse trapping. For the LMA-8 (NL-3.3-890-02) fiber, the dispersive wave emits at 604 nm (360 nm), and diverts ~8% (0.1%) of energy from the input pump pulse. These are extraordinary results because comparable conversion efficiency and frequency up-conversion ratio are obtained at 50 times lower pump pulse energies than those reported previously by Joly (2011). The NL-3.3-890-02 case, shown in FIG. 2A, shows an unprecedented frequency up-conversion ratio (>4) for solid-core fibers.

Of more practical interest is the dispersive wave 215 generated in the LMA-8 fiber, shown in FIG. 2C, which retains a "resonant" nature at surprisingly high average power of ~100 mW (pulse energy of ~2 nJ).

Features typifying a resonant dispersion wave (RDW), which has been defined above, include: (1) sudden and complete generation within a short (a few mm) fiber segment corresponding to maximum input pulse compression; (2) isolated Gaussian-like spectrum far from the pump spectrum, with no non-specific continuum features between the pump wavelength and that of the RDW; and (3) a central wavelength dictated by a nonlinear-phase-corrected phase-matching condition. The reader is referred to Tu et al., *Optical frequency up-conversion by supercontinuum-free widely-tunable fiber-optics Cherenkov radiation*, Opt. Express, vol. 17, pp. 9858-72 (2009) (hereinafter, "Tu (2009)", incorporated herein by reference, for discussion of the nonlinear-phase-corrected phase-matching condition. The former two are directly confirmed in FIGS. 2C and 2D, while the third feature can be verified by reproducing the resonant wavelength of 604 nm (within 5 nm) with the phase-matching condition.

Non-linear effects in a fiber require large field strengths, thus small core diameters would appear to be preferable, in order to enhance pump power per unit area for limited available pump intensities. Considerations of propagation through a PCF in a region of anomalous dispersion also dictate small core diameters, since the large the core diameter, the closer the dispersion properties of the fiber approach those of the core material, typically pure silica, with a ZDW near 1.3 μm. In view of prior instances of RDW discussed in the Background section above, reduction to practice of a high power continuum-free visible RDW in a low-nonlinearity fiber ran counter to the general wisdom. Another entirely unexpected aspect of the present invention is the enlarged RDW bandwidth over the pump bandwidth which advantageously supports sub-20-fs pulse compression, as discussed in detail below. Previously reported broadband RDW had required ultrashort (<10-fs) pumping or fiber tapering.

To obtain high-power high-quality RDW free of supercontinuum contamination, soliton order N is preferably kept at around 10, i.e., $$N^2 = \frac{\gamma T_0^2}{|\beta_2|} P_0 \approx 100, \text{ where } \gamma = \frac{2\pi n_2}{\lambda A_{eff}},$$

and where $P_0$ is the peak power of the pump laser, $T_0$ is the temporal pulse width of the pump laser, $\beta_2$ is the second-order dispersion constant of the fiber at the pump wavelength, $\gamma$ is the nonlinear coefficient of the fiber, $n_2$ is the nonlinear-index coefficient of fiber core material (glass) which can be treated as a constant, $\lambda$ is the central wavelength of the pump laser, and $A_{eff}$ is the effective mode area of the fiber which can be approximately treated as the fiber core area (scaled with $d^2$, d is the core diameter).

For a given N (~10), the pump-to-RDW conversion efficiency is mainly dictated by $T_0$ (e.g., typically, 30% for 10 fs pulse, 7% for 100 fs pulse, 1% for 1 ps pulse). Thus, for a given typical pulse width of ~100 fs at N=10, the output power of RDW ($P_{RDW}$) is proportional to $$P_{RDW} \propto \lambda d^2 |\beta_2|.$$

Thus, to scale up the RDW, it is beneficial to have a longer pump wavelength $\lambda$, a larger fiber core diameter d, and a larger second-order dispersion constant $|\beta_2|$. It is particularly beneficial to scale up the RDW using a large d (say, >5 μm), due to the quadratic dependence. In this regime, the zero-dispersion wavelength of the fiber approaches that of the fiber core material (~1.3 μm for pure silica glass). Thus, $\lambda$ is preferably be larger than this wavelength (i.e., $\lambda$>1.3 μm) to ensure a large $|\beta_2|$ for high-power RDW generation.

A portable RDW fiber source in accordance with an embodiment of the present invention is now described with reference to FIG. 1, where the portable RDW fiber source is designated generally by numeral 100.

An all-fiber MOPA design based on a passively mode-locked fiber Er:fiber oscillator is employed, along the lines described by Pavlov et al., *High-power high-repetition-rate single-mode Er-Yb-doped fiber laser system*, Opt. Express, vol. 20, pp. 9471-75 (2012), which is incorporated herein by reference. According to Pavlov, the state-of-the-art Er:fiber system employing an Er/Yb co-doping technique produces 16-nJ 450-fs compressed pulses. Such pulses, however, are inadequate for generating the intended RDW.

In accordance with the present invention, an all-fiber MOPA design is adopted, based on a passively mode-locked oscillator 108. In a preferred embodiment of the invention, the passively mode-locked oscillator is an Er:fiber oscillator, though other oscillators may be employed within the scope of the present invention. A doped fiber 102, seeded by oscillator 108, is pumped by a pump diode laser 104 via a wavelength division multiplexer (WDM) 106, serving to extract counter-propagating amplified spontaneous emission from fiber 102. In a preferred embodiment of the invention, fiber 102 is Erbium-doped. Passively mode-locked fiber laser 108, followed by a stretcher 110, serves as the seed source. Power amplification is provided by an Yb:Er co-doped fiber 112, optically pumped by dual pump diode lasers 114 coupled to the Yb:Er co-doped fiber 112 via optical combiner 116. Output of the foregoing components is coupled out of laser box 120 via a high-power optical isolator 122 and delivery fiber 124. Typical operating conditions of the all-fiber MOPA source, in accordance with the present invention, include shortened pulse duration of ~80-fs (FWHM) pulse energy in the general range of 46 nJ at 50-MHz (2.3 W average power). The fibers employed are all-polarization-maintaining single-mode fibers, providing polarized output and environmental stability. Laser head 130 and a fiber-pumping apparatus 140, described in detail in Tu (2009), are mounted on a small optical breadboard making the entire whole RDW fiber source system 100 readily portable. Output of laser head 130 is coupled via half-wave plate 132, polarizing beam-splitter 134, and an aspheric lens 142 that provides for 60-85% coupling efficiency of pump pulse energy to a cleaved optical fiber 144. (The length of optical fiber 144 is 9 cm in a typical case). The output of optical fiber 144 includes an RDW 150 that is blue-shifted by as much as 500 nm, or even by more than 700 nm, relative to the pump wavelength. Optical fiber 144 is chosen from among a set of PCFs with various core diameters and a standard telecommunication fiber, such as SMF-28 available from Corning, Inc. The core diameter of optical fiber 144 exceeds the central wavelength of RDW 150 by at least a factor of 5, and, in some embodiments, by a factor of 8 or more. This may advantageously provide for higher levels of RDW generation, and for a larger blue-shift (>500 nm) of the RDW wavelength from the pump wavelength. In a preferred embodiment of the present invention, most, or all, components are instantiated in fiber, as enabled by the conditions that have been described, and optical energy is optically guided throughout the fiber source system 100.

EXAMPLE

RDW emission 150 in the red portion of the spectrum is emitted from the LMA-8 fiber when the input pulse energy (measured as fiber output pulse energy assuming zero transmission loss) reaches a threshold value. At input pulse energies exceeding the threshold value, the pulse energy of the RDW increases with the input pulse energy according to a conversion efficiency of ~7%. With increasing pulse energy, the RDW spectrum undergoes a blue-shift and broadening, but retains its Gaussian-like spectrum, until it is finally disrupted by an interference-like effect. The progressive evolution of a Gaussian-like spectrum results in broad wavelength tuning (595-670 nm) and pedestal-free 17-fs pulse compression. Interestingly, the PCF 144 cleans up and shortens the complex-shaped input (fiber laser) pulses present at laser head 130 through a blue-shifted wavelength conversion.

As now described with reference to FIG. 3, other PCFs, along with the standard telecommunication fiber (SMF-28), produce RDWs throughout 370-850 nm with comparable conversion efficiencies. The RDW from each of six optical fibers shown in FIG. 3 undergoes a large (>700 nm) blue-shift from the pump wavelength, retains the Gaussian-like spectrum before the interference-like disruption, and aligns itself with the input pulse in polarization with an extinction ratio of >25 dB. Blue shifts exceeding 500-700 nm are within the scope of the present invention. Thus, for example, the RDW generated from a polarization-maintaining PCF (LMA-5-PM) approximates that from its non-polarization-maintaining counterpart (LMA-5) if the input polarization is aligned with a principal axis of the fiber.

Figure 3:
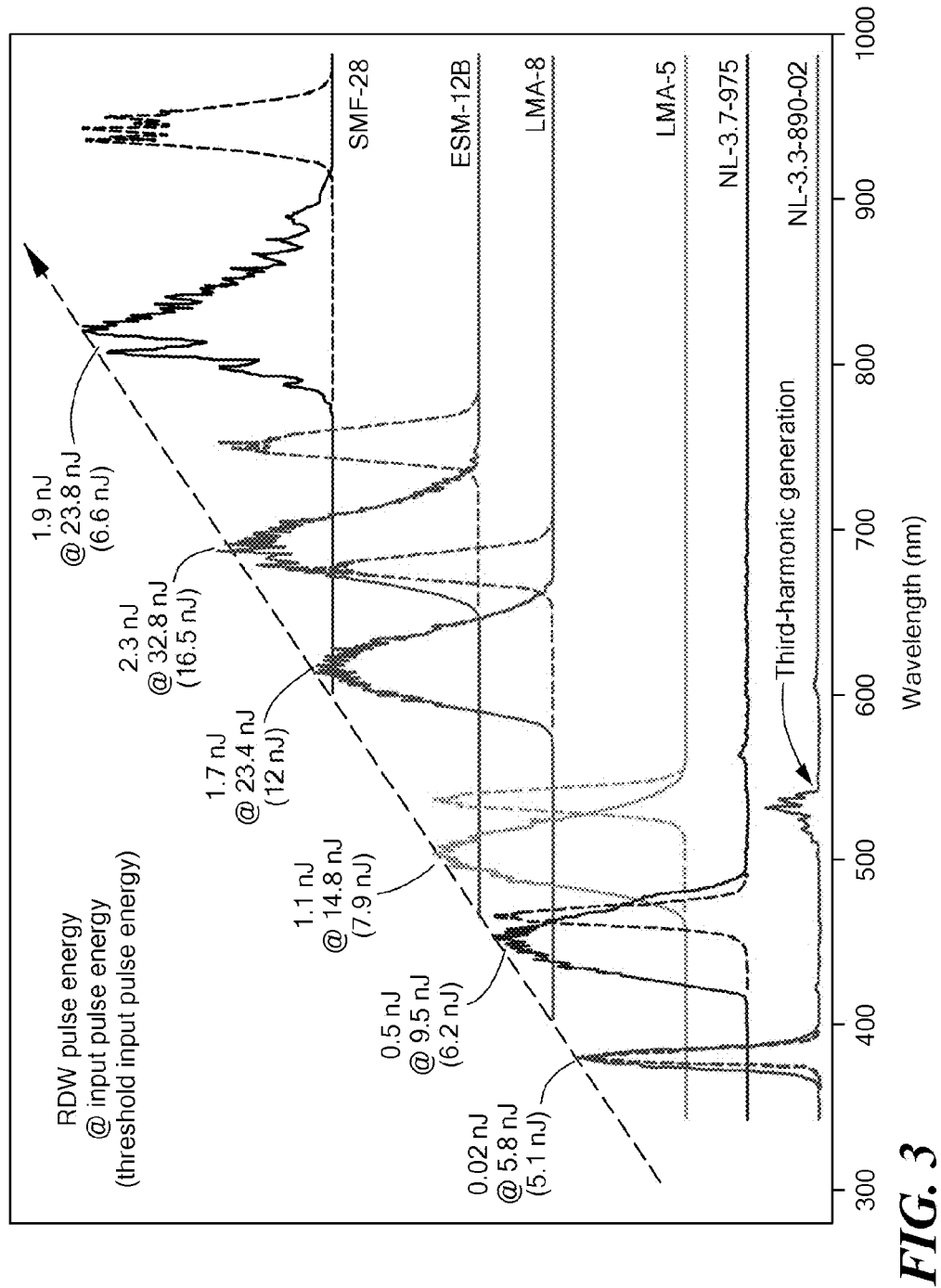
FIG. 3 depicts RDW spectra at threshold input pulse energies and at higher input pulse energies shown, along with measured RDW pulse energies.

In FIG. 3, measured RDW pulse energies are listed on the topmost diagonal, while the input pulse energies giving rise to the stated RDW pulse energies are given in the second diagonal row. The lower row lists the threshold input pump energies for respective optical fibers.

Typically, a supercontinuum generated in fiber from a femtosecond pulse has insufficient coherence for transform-limited pulse compression, even when the full phase compensation of a spatial light modulator-based 4f pulse shaper is employed as described by Schenkel et al., *Pulse compression with supercontinuum generation in microstructure fibers, J. Opt. Soc. Am. B*, vol. 22, pp. 687-93 (2005), which is incorporated herein by reference. As a consequence, pulse compression is usually conducted on the supercontinuum generated completely in a normal dispersion regime of the fiber, using techniques such as the multiphoton intrapulse interference phase scan (MIIPS). In accordance with the present invention, by using a MIIPS-assisted 4f pulse shaper, Femto-Jock, available from Biophotonics Solutions Inc. of East Lansing, Mich., high quality transform-limited compression of the 1.7-nJ RDW from the LMA-8 fiber can be achieved, as indicated by the 15-fold increase of the second-harmonic signal after compression and the straight parallel MIIPS traces free of non-specific components. The compressed RDW is a clean 17-fs (FWHM) pulse, corresponding to an 8-cycle pulse at 620 nm. Because the chirp of the RDW pulse is largely linear, a simple linear compressor would lead to 25-fs (FWHM) compression. Similar compressibility is generally applicable to other RDW pulse energies or the RDWs from other fibers (including SMF-28).

In comparison to the fs Yb:fiber platform, the Er platform described herein has the advantage that anomalous dispersion at the pump wavelength can be achieved in large-core fibers, where "large-core" refers to optical fibers characterized by a core diameter larger than five times the RDW central wavelength. Anomalous dispersion in large-core fibers, in turn, facilitates RDW power scaling and simplifying the cascaded fusion splicing to build more robust all-fiber RDW sources. Cascaded fusion is described in detail in Nicholson et al., *visible continuum generation using a femtosecond erbium-doped fiber laser and a silica nonlinear fiber, Opt. Lett.*, vol. 33, pp. 28-(2008), incorporated herein by reference.

Strongly blue-shifted (>500 nm) RDW sources may also be built upon Thulium (Tm)-, or other rare-earth-, doped fiber technologies for extended spectral coverage, within the scope of the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for generating ultrashort optical pulses, the method comprising:
   a. coupling pump pulses of an infrared source characterized by a pump wavelength into an optical fiber characterized by a core diameter and a zero-dispersion wavelength, the pump wavelength exceeding the zero-dispersion wavelength of the optical fiber by at least 100 nm; and
   b. generating resonant dispersion wave (RDW) emission in the optical fiber, the RDW emission spectrally isolated from the pump pulses and characterized by a central wavelength blue-shifted by more than 500 nm relative to the pump wavelength;

wherein the core diameter of the optical fiber exceeds the central wavelength of the RDW by at least a factor of five.

2. A method in accordance with claim 1, wherein the RDW emission is characterized by a central wavelength blue-shifted by more than 700 nm relative to the pump wavelength.

3. A method in accordance with claim 1, further comprising temporally compressing the RDW emission.

4. A method in accordance with claim 1, wherein the pump pulse energy exceeds 40 nJ.

5. A method in accordance with claim 1, wherein the RDW emission exceeds 1 nJ per pulse.

6. A method in accordance with claim 1, wherein the infrared source includes a master-oscillator-power-amplifier.

7. A method in accordance with claim 1, wherein the infrared source is based upon an Erbium-doped fiber mode-locked oscillator.

8. An apparatus for generating ultrashort optical pulses characterized by a central wavelength, the apparatus comprising:
   a. a source of infrared pulses characterized by a wavelength;
   b. an optical fiber characterized by a core diameter and a zero-dispersion wavelength (ZDW), wherein the wavelength of the infrared pulses exceeds the ZDW of the optical fiber by at least 100 nm, and wherein the core diameter of the optical fiber exceeds the central wavelength of the ultrashort optical pulses by at least a factor of five.

9. An apparatus in accordance with claim 8, wherein the source of infrared pulses includes a master-oscillator-power-amplifier.

10. An apparatus in accordance with claim 8, wherein the infrared source is based upon an Erbium-doped fiber mode-locked oscillator.

11. An apparatus in accordance with claim 8, wherein the optical fiber is polarization-maintaining.

12. An apparatus in accordance with claim 8, wherein optical energy is optically guided through all components.

\* \* \* \* \*